US011894183B2

(12) United States Patent
Bustreo et al.

(10) Patent No.: US 11,894,183 B2
(45) Date of Patent: Feb. 6, 2024

(54) WINDING

(71) Applicant: HITACHI ENERGY LTD, Zürich (CH)

(72) Inventors: Gianluca Bustreo, Mirano (IT); Paolo Pavanello, Granze (IT); Valentina Valori, Monselice (IT); Martina Perin, Pionca di Vigonza (IT)

(73) Assignee: HITACHI ENERGY LTD, Zürich (CH)

(*) Notice: Subject to any disclaimer, the term of this patent is extended or adjusted under 35 U.S.C. 154(b) by 0 days.

(21) Appl. No.: 18/020,299

(22) PCT Filed: Nov. 2, 2021

(86) PCT No.: PCT/EP2021/080368
§ 371 (c)(1),
(2) Date: Feb. 8, 2023

(87) PCT Pub. No.: WO2022/096452
PCT Pub. Date: May 12, 2022

(65) Prior Publication Data

US 2023/0215609 A1 Jul. 6, 2023

(30) Foreign Application Priority Data

Nov. 6, 2020 (EP) .................................... 20206321

(51) Int. Cl.
*H01F 27/30* (2006.01)
*H01F 5/02* (2006.01)
*H01F 5/00* (2006.01)

(52) U.S. Cl.
CPC ......... *H01F 5/02* (2013.01); *H01F 2005/006* (2013.01)

(58) Field of Classification Search
CPC .......................................................... H01F 5/02
USPC .......................................................... 336/199
See application file for complete search history.

(56) References Cited

U.S. PATENT DOCUMENTS 2,425,304 A 8/1947 Combs
3,302,149 A * 1/1967 Forsha .................. H01F 27/322 336/60
3,683,495 A * 8/1972 Feather ............... H01F 27/2871 29/605

(Continued)

FOREIGN PATENT DOCUMENTS

WO 2020005275 A1 1/2020

OTHER PUBLICATIONS

International Search Report and Written Opinion of the International Searching Authority, PCT/EP2021/080368, dated Feb. 23, 2022, 13 pages.

*Primary Examiner* — Ronald Hinson
(74) *Attorney, Agent, or Firm* — Sage Patent Group

(57) ABSTRACT

A winding is provided, which comprises a form element having a longitudinal axis defining a longitudinal direction and a radial direction perpendicular to the longitudinal axis. The form element comprises a core with a lateral surface, and adjustable elements arranged on the lateral surface of the core. The adjustable elements are elongated and extend along the longitudinal direction. A thickness of the adjustable elements in a radial direction is altered along the longitudinal direction. A conductor is wound around the form element along the longitudinal direction forming turns of the winding.

15 Claims, 7 Drawing Sheets

(56) References Cited

U.S. PATENT DOCUMENTS

| | | | | | |
|---|---|---|---|---|---|
| 3,713,061 | A * | 1/1973 | Weber | H01F 27/343 | 336/206 |
| 3,891,955 | A * | 6/1975 | Horton, III | H01F 27/306 | 174/117 FF |
| 3,974,302 | A * | 8/1976 | Croop | H01F 41/122 | 29/605 |
| 5,651,175 | A * | 7/1997 | Grimes | H01F 27/322 | 29/605 |
| 6,221,297 | B1 * | 4/2001 | Lanoue | B29C 70/70 | 29/605 |
| 6,308,401 | B1 * | 10/2001 | Gress | H01F 27/2871 | 29/605 |
| 6,980,076 | B1 * | 12/2005 | Rolling | H01B 3/52 | 174/124 R |
| 8,111,123 | B2 * | 2/2012 | Lim | H01F 27/322 | 336/55 |
| 2002/0130749 | A1 * | 9/2002 | Hay | H01F 27/323 | 336/190 |
| 2003/0038699 | A1 * | 2/2003 | Nakatsu | H01F 27/2847 | 336/206 |
| 2005/0162248 | A1 * | 7/2005 | Day | H01F 5/06 | 335/220 |
| 2013/0021127 | A1 * | 1/2013 | Sarver | H01F 41/084 | 29/605 |
| 2013/0200967 | A1 * | 8/2013 | Xu | H01F 27/34 | 336/5 |
| 2015/0123758 | A1 * | 5/2015 | Patel | H01F 27/324 | 336/198 |
| 2015/0380148 | A1 * | 12/2015 | Looby | H01F 1/153 | 336/212 |
| 2017/0271065 | A1 | 9/2017 | Keller | | |

* cited by examiner

WINDING

CROSS REFERENCE TO RELATED APPLICATIONS

This application is a 35 U.S.C. § 371 national stage application of PCT International Application No. PCT/EP2021/080368 filed on Nov. 2, 2021, which in turn claims priority to European Patent Application No. 20206321.0, filed on Nov. 6, 2020, the disclosures and content of which are incorporated by reference herein in their entireties.

TECHNICAL FIELD

The present disclosure relates to a winding.

BACKGROUND

Windings and coils are electronic components that are suitable for generating or detecting a magnetic field. They are electrical components or are parts of electronic devices, such as electric motors, speakers, transformers or relays. Moreover, windings and coils are inductive passive components whose main characteristic is a defined in the inductance of the winding. As a passive component they can be employed in signal processing, in LC resonant circuits, low pass filters, high pass filters, for signal phase correction, for suppression of electrical interferences, for current flow smoothing or as energy storage as well as many other electrical applications.

Due to the high variety in the requirements for windings, windings can be found in all kind of sizes, shapes and forms. Nevertheless, a common structure for windings consists in a conductor which is wound around a form element, e.g., a bobbin, in order to form a plurality of adjacent turns. As the form element and the conductor, but also winding mandrels, rotators or other means and components employed for manufacturing the winding, are subjected to production tolerances themselves, the assembled windings exhibit a broad spread and deviations from the intended design, be it the inductance or the extent of the winding.

The above-illustrated issue may lead to a high reject of the produced winding, especially if the precise extent, the shape or the inductance of the winding is critical.

SUMMARY

The object of the present disclosure is to provide a winding which allows the above-mentioned technical issues to be overcome.

This object is solved by the features of the independent claim.

A winding is provided, which comprises a form element having a longitudinal axis defining a longitudinal direction and a radial direction perpendicular to the longitudinal axis. The form element comprises a core with a lateral surface, and adjustable elements arranged on the lateral surface of the core. The adjustable elements are elongated and extend along the longitudinal direction. A thickness of the adjustable elements in a radial direction is altered along the longitudinal direction. A conductor is wound around the form element along the longitudinal direction forming turns of the winding.

Since the conductor is wound around the form element, which outer shape is defined by the adjustable elements, the properties of the winding, as the inductance and the extents of the winding, are determined by the design of the adjustable elements, which can be adapted by altering the thickness of them. In this way production tolerances of components building the winding as well as uncertainties introduced by means to manufacture the winding can be compensated by tuning the thickness of the adjustable elements along the longitudinal direction.

As an example, the thickness of the adjustable elements can increase or decrease linearly, or fluctuate along the longitudinal direction, depending on the required compensation and intended design of the winding.

The cross section of the form element perpendicular to the longitudinal axis can be symmetrical to a central point of the cross section to provide an even force distribution in the radial direction of the winding.

Also, the adjustable elements may be arranged uniformly on the lateral surface of the core. As in this configuration the conductor may rest on the evenly distributed adjustable elements, radial forces generated during operation of the winding apply evenly on the core, stabilizing the winding.

For example, 12, 16, 24 or 36 adjustable elements may be arranged on the lateral surface of the core. Depending on the perimeter of the core and the width of the adjustable elements, these number are suited for generating a uniform distribution of the adjustable elements on the core and providing a sound support for the conductor.

In an embodiment the thickness of the adjustable elements in a radial direction can alter gradually along the longitudinal direction. An abrupt change in the thickness of the adjustable elements could lead to a sharp edge on the surface of the adjustable element facing the conductor. This sharp edge in turn might potentially damage the conductor or an electrical insulation on the conductor. By altering the thickness of the adjustable elements gradually, edges as a source of danger are prevented.

The thickness of the adjustable elements in a radial direction may vary by an amount of 0.1 mm to 10 mm along the longitudinal direction. Depending on the production tolerance of the components building the winding more or less variation in the thickness of the adjustable elements is required to compensate the error and achieve the intended properties.

Additionally, the adjustable elements can comprise stacked layers, wherein the thickness of the adjustable elements in a radial direction can be altered by removed or added layers along the longitudinal direction. The layers themselves may have the same thickness or different thicknesses. If different thicknesses of layers are employed the process for altering the thickness of the adjustable elements can be optimized, as the desired thickness can be achieved with less added or removed layers. Furthermore, the layer may be relatively flexible. Thus, the layers can be bent in order to add or remove a layer from in between the stack, and a covering layer facing the conductor can adapt to the variation in thickness of the adjustable elements in a radial direction.

The layers may comprise a first type of layer and a second type of layer, wherein the first type of layer has a greater thickness than the second type of layer. Moreover, the thickness of the adjustable element can be altered along the longitudinal direction by either a removed at least one second type of layer, or by an added at least one second type of layer. As the second type of layer is thinner than the first type of layer, a smaller increment for altering the thickness of the adjustable element can be achieved. The thicker first type of layer meanwhile contributes to the solidity of the adjustable element.

According to one embodiment at least one second type of layer may be arranged on the core in a radial direction and one first type of layer can be stacked on the at least one first type of layer. The thickness of the adjustable element can be altered along the longitudinal direction by either a removed at least one second type of layer, or by an added at least one second type of layer added in between the core and the first type of layer. Therefore, the first type of layer covers and adapts to the edge generated by the removed or added layer altering the thickness of the adjustable elements gradually along the longitudinal direction.

Additionally, a further first type of layer can be arranged on the one first type of layer in a radial direction, and the thickness of the adjustable element may be altered along the longitudinal direction by either a removed at least one second type of layer, or by an added at least one second type of layer added in between the core and the further first type of layer. Adding the at least one second type of layer in between the first type of layers may be beneficial as the first type of layer, which are thicker than the second type of layers, aids in fixing the added second type of layer.

In another embodiment one first type of layer can be arranged on the core in a radial direction and at least one second type of layer can be stacked on the at least one first type of layer, and a second first type of layer can be stacked on the at least one second type of layer. The thickness of the adjustable element may be altered along the longitudinal direction by either a removed at least one second type of layer, or by an added at least one second type of layer added in between the first type of layers. The first type of layer arranged on the core is more durable compared to an alternative of a second type of layer and forms a stable socket for the sacked layers on top. The second first type of layer assists in holding the second type of layer on the first type of layer arranged on the core. Moreover, the second first type of layer being more robust, helps to protect the stacked layer and provides a sound support surface for the wound conductor.

The first type of layer can have a thickness of 3 mm to 10 mm and the second type layer can have a thickness of 0.1 mm to 0.5 mm. The thickness range of 3 mm to 10 mm for the first type of layer allows the first type of layer to be still relatively flexible, which may ease to add or remove a layer during manufacturing process of the winding, while being solid enough to form a loadable adjustable element. The second type of layer with a thickness range of 0.1 mm to 0.5 mm permits a precise adjustment of the thickness of adjustable elements and yet being workable with in the manufacturing process.

Moreover, the layers can be adhered to each other or the core at discrete spots along the longitudinal direction. Depending on the material of the layer and its surface roughness a suitable adhesive or glue can be used. Not adhering the layer over the whole longitudinal length facilitates to add or remove a layer, because just the discrete spots of adhesive have to be loosened for removing a layer or subjoined to add a layer. According to one embodiment the layers can be adhered to each other or the core along a certain length in a longitudinal direction at the beginning or perhaps the end of the adjustable element to enhance the cohesion of the layers.

The layers may comprise materials based on cellulose fiber as paper, pressboard, cardboard, wooden strips, wooden sticks, batten or materials based on a polymer as DDP, epoxy or silicone. These materials are relatively inexpensive and durable enough, notably in an oil which is commonly used for cooling purposes. Besides, these materials are relatively elastic, which can be convenient for the manufacturing process.

In a further embodiment spacer elements may be arranged in between the turns of the winding. The spacer elements may consist of an electrically insulating material in order to prevent short circuits between the turns. By arranging the spacer elements along the longitudinal direction, the winding structure can be consolidated.

Additionally, the spacer elements can be located above the adjustable elements in a radial direction. According to this embodiment spacer elements are located above the adjustable elements, improving the stability of the winding.

In the following, embodiments are described with reference to the figures. Same parts or parts with equivalent effect are referred to by the same reference numbers.

BRIEF DESCRIPTION OF FIGURES

The figures serve solely to illustrate the invention and are therefore only schematic and not drawn to scale. Some parts may be exaggerated or distorted in the dimensions. Therefore, neither absolute nor relative dimensions can be taken from the figures. Identical or identically acting parts are provided with the same reference numerals.

DETAILED DESCRIPTION

Figure 1:
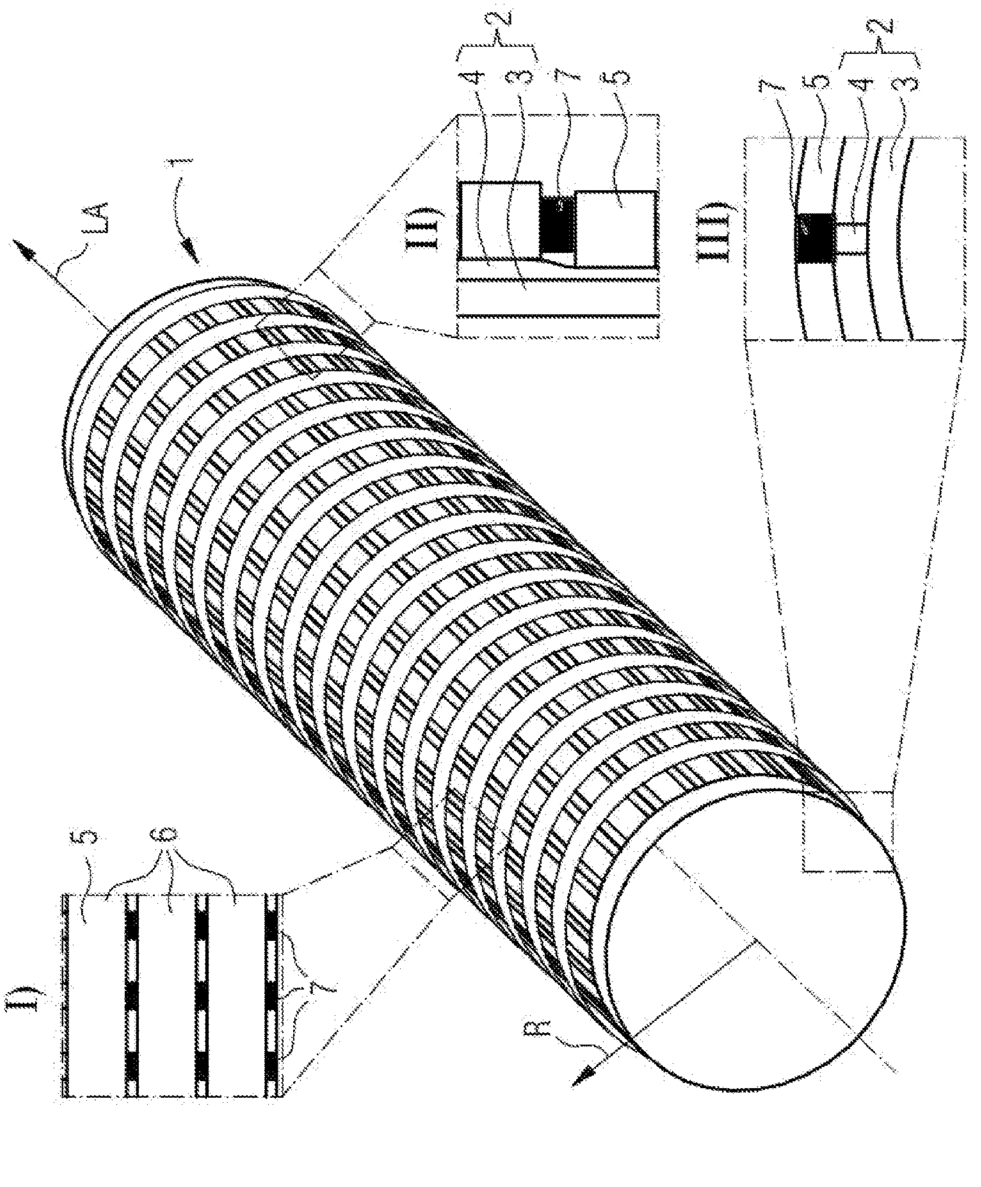
FIG. 1 shows a spatial representation of an embodiment of a winding.

FIG. 1 shows a spatial representation of an embodiment of the winding 1. The winding 1 comprises a form element 2 having a longitudinal axis LA defining a longitudinal direction L and a radial direction R perpendicular to the longitudinal axis LA. The form element 2 consists of a core 3 and elongated adjustable elements 4 that are arranged on a lateral surface of the core 3 such that they extend along the longitudinal direction L. Here, the core 3 is cylindrical, but it is not limited to this and can have any other shape, e.g., rectangular. A conductor 5 having a rectangular profile is wound around the form element 2 along the longitudinal direction L forming turns 6 of the winding 1. Spacer elements 7 are arranged in between the turns 6 aligning in the longitudinal direction L, as illustrated in FIG. 1 I). Such an arrangement of the spacer elements 7 provides an excellent stability to the winding 1, as forces applying on the winding 1 in the longitudinal direction L do not generate any leverage, torque or lateral forces between the spacer elements 7 and the conductor 5.

Figure 2:
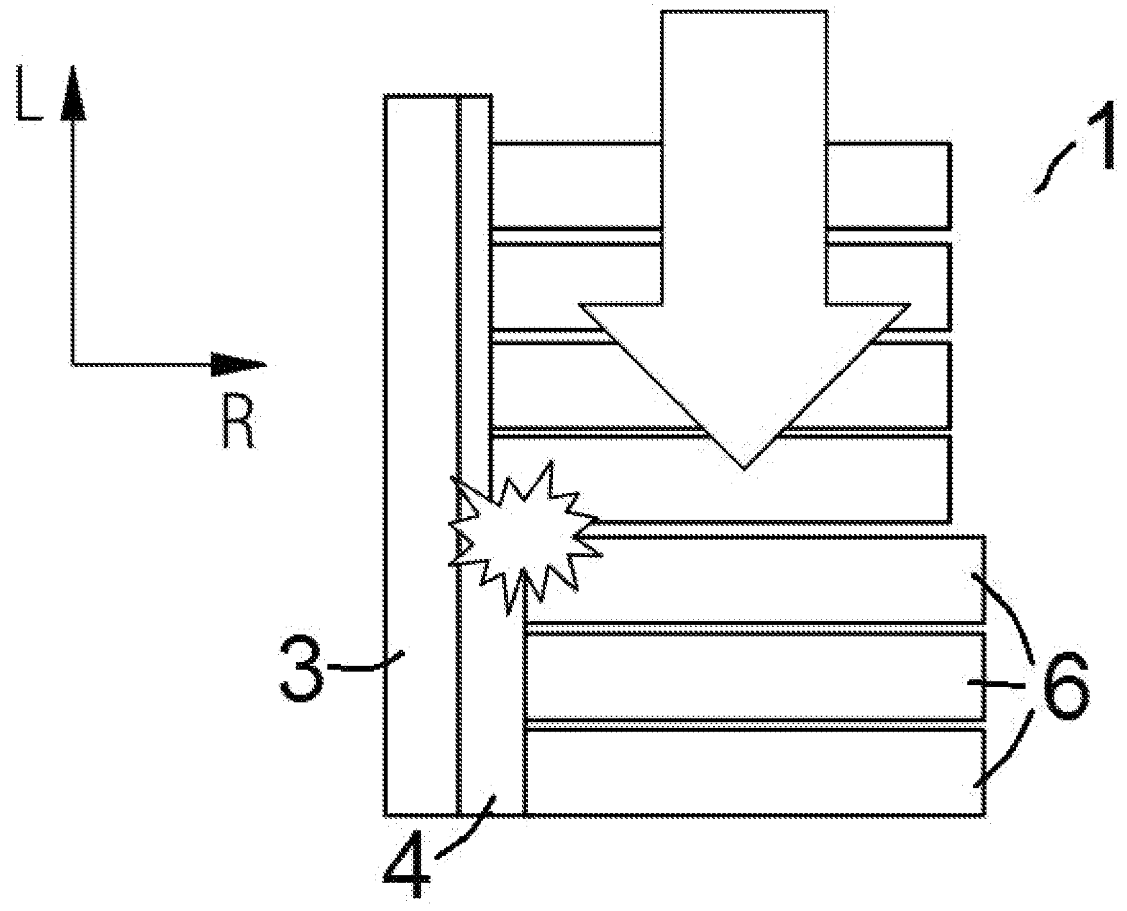
FIG. 2 shows a cross section of a form element along a longitudinal direction with a sharp edge.

The thickness of the adjustable elements 4 is altered along the longitudinal direction L in order to make up for the production tolerances of the conductor 5 and the core 3. In the embodiment shown in FIG. 1 the thickness of the adjustable elements 4 is altered gradually, as shown in FIG. 1 II). In this way a sharp edge on the surface of the adjustable element 4 facing the conductor 5 can be omitted which could harm the conductor 5, as shown in FIG. 2.

Due to the altered thickness of the adjustable elements, the turns 6 of the winding 1 can be shifted a bit in the radial direction R, as shown in FIG. 1 II). However, as far as the turns 6 overlap more than 95% along the longitudinal direction L, a high stability for the winding 1 is given. In FIG. 1 III) it can be seen that the conductor 5 is supported by the adjustable element 4 forming a gap between the core 3 and the conductor 5 besides the adjustable elements 4. The conductor 5 is wound around the form element 2 such that the spacer elements 7 are located above the adjustable elements 4.

Figure 3:
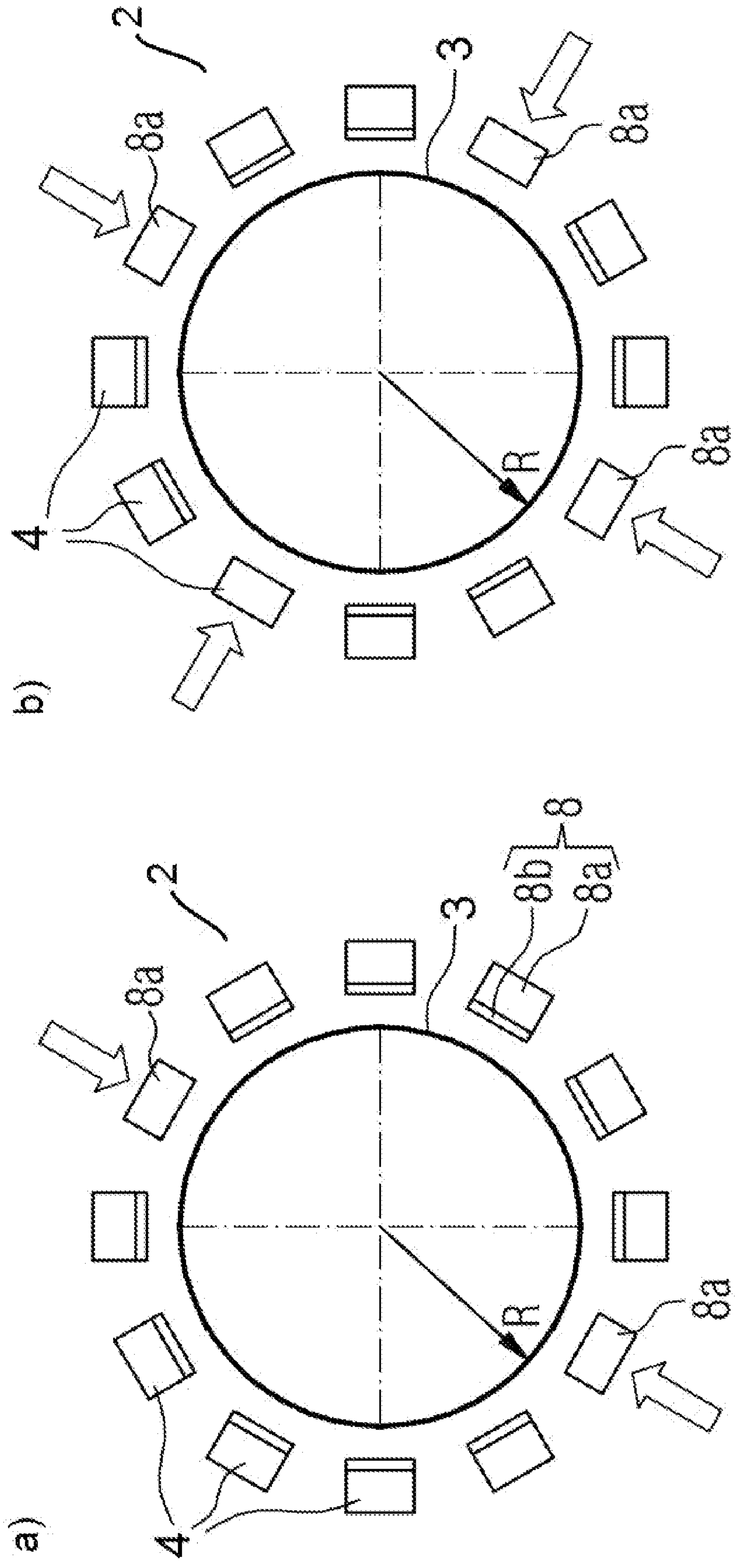
FIGS. 3A and 3B show cross sections of form elements along a radial direction comprising a core and adjustable elements.

FIG. 3A and FIG. 3B show cross sections of form elements 2 in the radial direction R. 12 adjustable elements 4 are arranged uniformly on the lateral surface of the form element 2 to distribute radial forces on the winding 1 evenly. Embodiments with 16, 24, 36 or even more adjustable elements 4 are appropriate, too. In the magnified view of the adjustable elements 4 it can be recognized that the adjustable elements 4 comprise stacked layers 8. A thicker first type of layer 8*a* is positioned outwards and a thinner second type of layer 8*b* is arranged in between the core 3 and the first type of layer 8*a*. The thickness of the adjustable element 4 is altered by removing the second type of layer 8*b* along the longitudinal direction L.

Exemplary, all the adjustable elements 4 comprise the first and second type of layer 8 in the beginning of the winding 1. Along the longitudinal direction L, the thickness of the adjustable element 4 is altered by removing second type of layers 8*b* from two adjustable elements 4 symmetrically on opposite sides of the core 3 as shown in FIG. 3A. Even further along the longitudinal direction L, additional second type of layers 8*b* can be removed to compensate for a stronger production deviations of the components, as shown in FIG. 3B.

FIG. 4A to 4C show cross sections of the winding 1 along the longitudinal direction L during the manufacturing process. The adjustable elements 4 have a similar structure as the adjustable elements 4 shown in FIG. 3, with one second type of layer 8*b* arranged one the core 3 and one first type of layer 8*a* stacked upon the second type of layer 8*b*. The layers 8 are adhered to each other and to the core 3 just at discrete spots S and not over the entire length, although the adhesive is distributed over a certain length in the beginning of the winding 1 to improve the cohesion of the layers 8. Thus, the removal of a layer 8 is simplified. In FIG. 4B the removal of the second type of layer 8*b* along the longitudinal direction L is shown. The covering first type of layer 8*a* is detached from the second type of layer 8*b* and bend outwardly. Next, the second type of layer 8*b* is cut in two, detached from the core 3 and removed from the form element 2. Here, just the removal of the second type of layer 8*b* is presented, but nevertheless the thickness of the adjustable element 4 also can be increased by adding one or more second type of layer 8*b* in between the core 3 and the first type of layer 8*a*.

As can be seen in FIG. 4C the first type of layer 8*a* adapts to the underlying surface and alters gradually along the longitudinal direction L. In this way a sharp edge on the surface of the adjustable element 4 is bypassed, which could damage the conductor 5 or and insulation, as shown in FIG. 2. Hence, it is desired that the layers 8 exhibit a certain degree of flexibility, which can be provided by using suitable materials and thicknesses for the layers 8. Suitable materials could for example be based on cellulose fiber as paper, pressboard, cardboard, wooden strips, wooden sticks or batten, but also materials based on a polymer as e.g., DDP, epoxy or silicone are applicable. For these materials thicknesses of 3 mm to 10 mm for the first type of layer 8*a* and 0.1 mm to 0.5 mm for the second type of layer 8*b* are reasonable to compromise between the required properties for the form element 2. For instance, the first type of layer 8*a* can be a wooden stick with a thickness of 4 mm and the second type of layer 8*b* a cardboard with a thickness of 0.2 mm.

Figure 4:
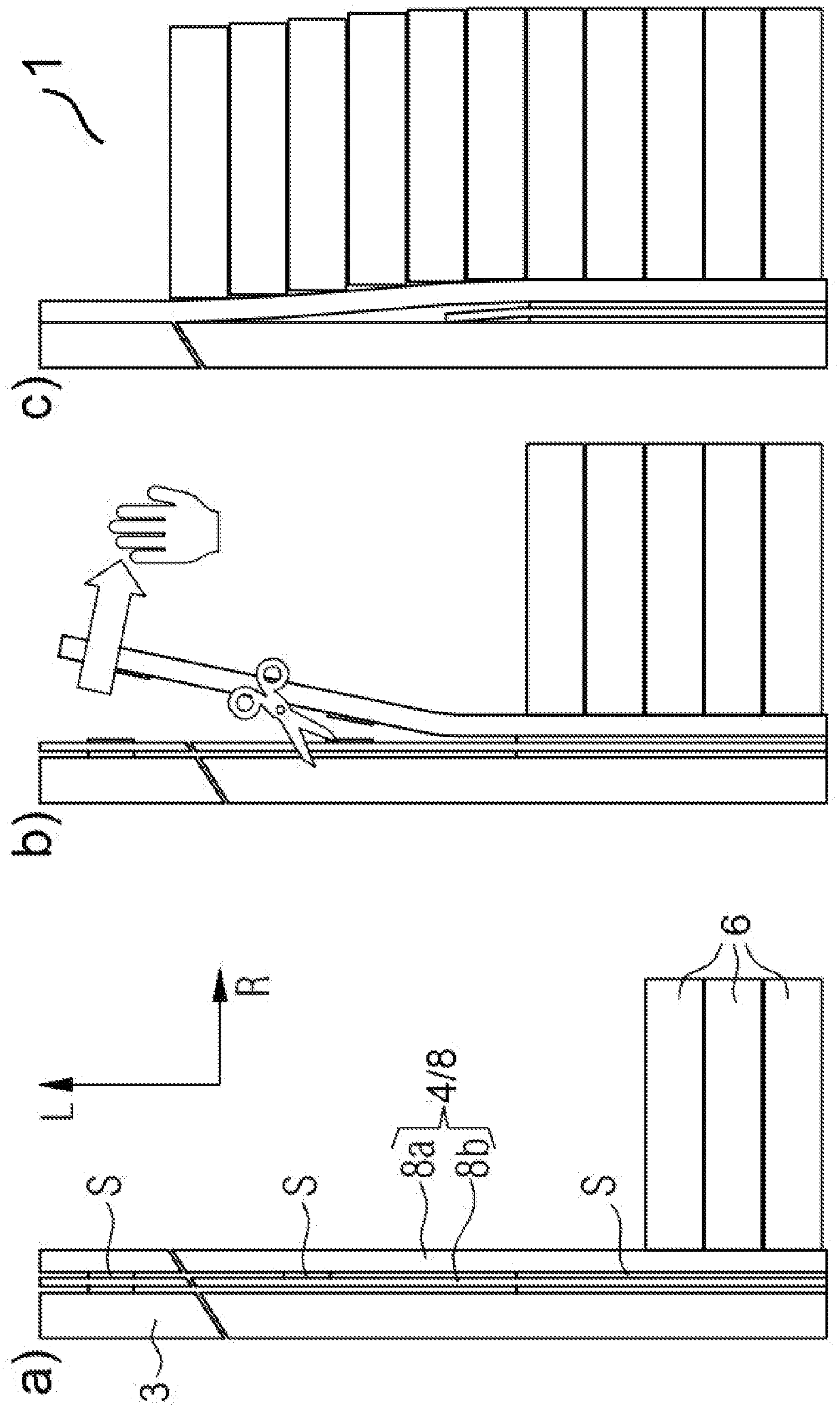
FIG. 4A to 4C show cross sections of a winding along a longitudinal direction during the manufacturing process.
Figure 5:
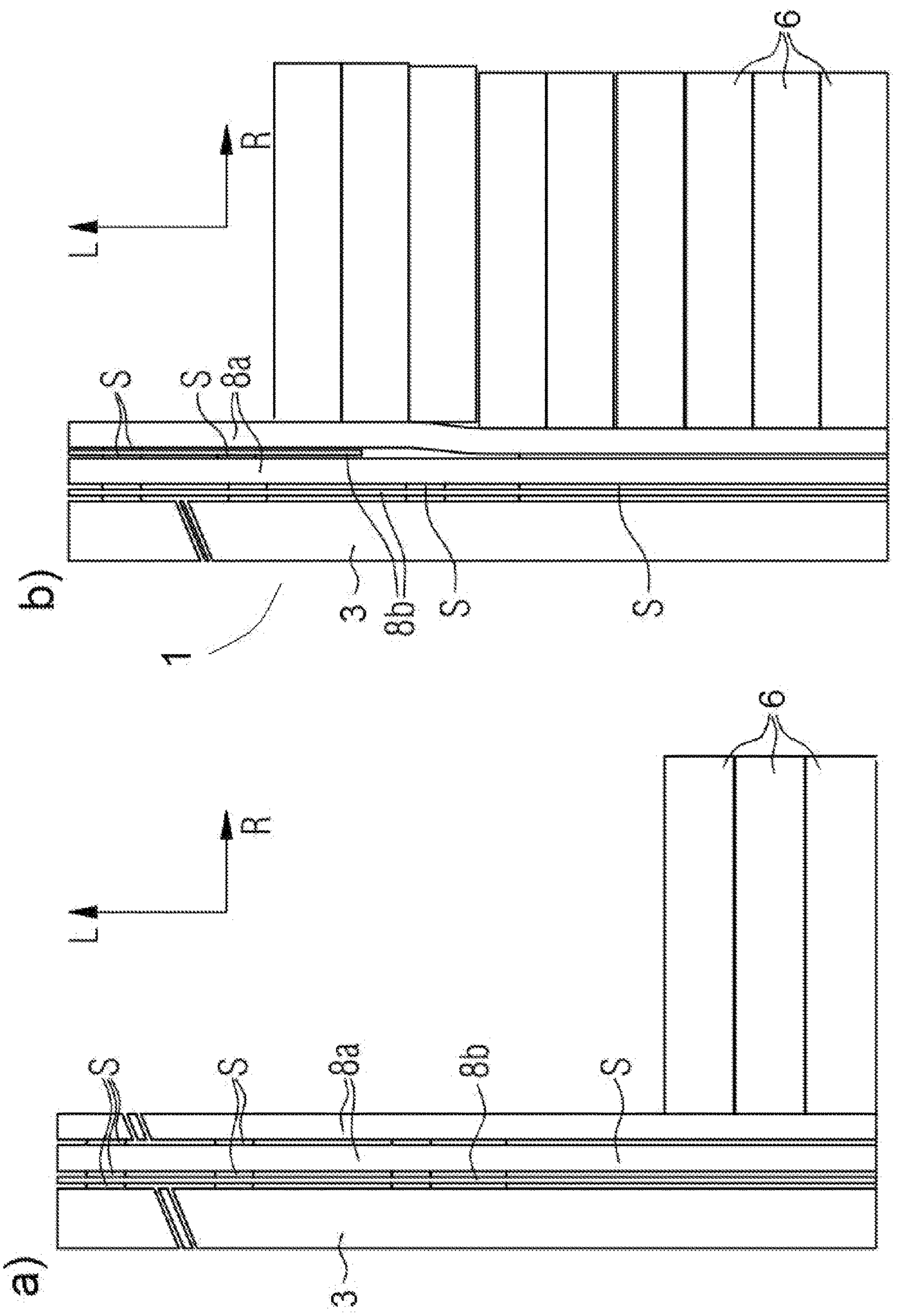
FIGS. 5A and 5B show cross sections of another embodiment of the winding along a longitudinal direction before and after the manufacturing process.

In the embodiment shown in FIGS. 5A and 5B, a further second type of layer 8*b* is arranged and adhered onto the layer 8 structure of the embodiment shown in FIG. 4A. The thickness of this adjustable element 4 can be reduced by removing the second type of layer 8*b*, in a similar way as shown in FIG. 4. In order to increase the thickness of the adjustable element 4 an additional second type of layer 8*b* is added, as shown in FIG. 5A. For adding the second type of layer 8*b*, the further first type of layer 8*a* is bent and the second type of layer 8*b* is disposed on and glued to the underlying first type of layer 8*a* and the further second type of layer 8*b*.

Figure 6:
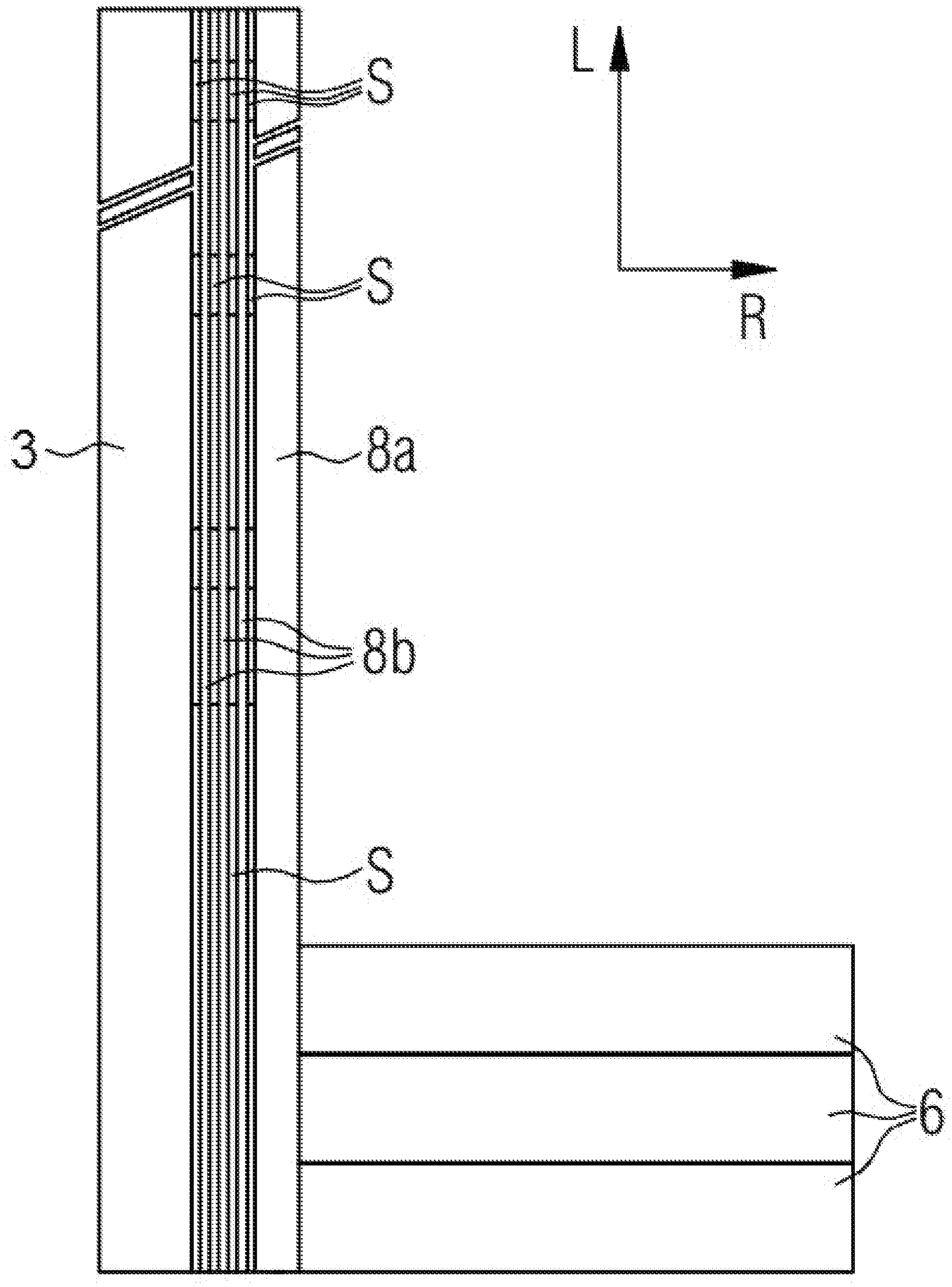
FIG. 6 shows a cross section of a form element along a longitudinal direction.

FIG. 6 shows an embodiment of the adjustable element 4, wherein three second type of layers 8*b* are arranged on top of each other in between the core 3 and the first type of layer 8*a*. Hence, the amount of the possible reduction in thickness is larger compared to the embodiment shown in FIG. 4 and FIG. 5. The three second type of layers 8*b* have the same thickness here but could also have different thicknesses. If second type of layers 8*b* with different thicknesses are employed, a layer 8 with a matching thickness to the desired amount of thickness reduction of the adjustable element 4 can be removed. In this way the manufacturing process can be accelerated, as it is not necessary to remove multiple thinner second type of layers 8*b* in several steps. As a matter of course the number of stacked second type of layer 8*b* is not limited to three.

Figure 7:
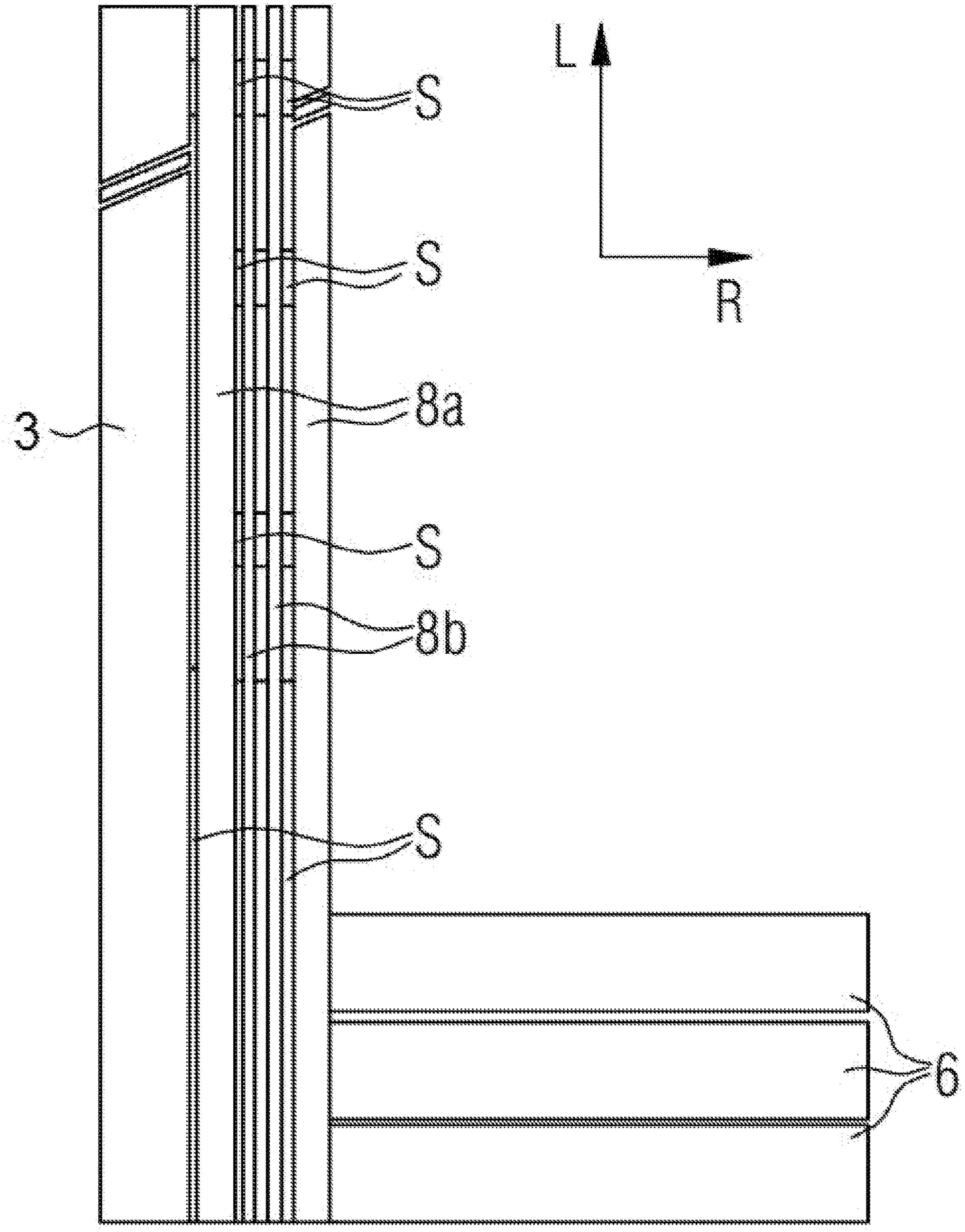
FIG. 7 shows a cross section of another embodiment of a form element along a longitudinal direction.

The adjustable element 4 shown in FIG. 7 consists of two stacked second type of layers 8*b* sandwiched between two first type of layers 8*a*. The first type of layer 8*a* arranged on the core 3 forms a stable socket for the second type of layers 8*b*, and the covering first type of layer 8*a* fixes the second type of layer 8*b* by clamping them. The thickness of this adjustable element 4 is altered either by removing or adding a second type of layer 8*b* in between the first type of layers 8*a*.

It has to be noticed that the present disclosure is not limited to the layouts described before and that further layouts can be retrieved by combination of features taken from different figures and embodiments.

LIST OF USED REFERENCE SYMBOLS

1 Winding
2 Form element
3 Core
4 Adjustable elements
5 Conductor
6 Turn
7 Spacer element
8 Layer
8*a* First type of layer
8*b* Second type of layer
LA Longitudinal axis
L Longitudinal direction
R Radial direction
S Spots of adhesion

We claim:

1. A winding, comprising, a form element having a longitudinal axis defining a longitudinal direction and a radial direction perpendicular to the longitudinal axis, the form element comprising:

a core with a lateral surface, and adjustable elements arranged on the lateral surface of the core, wherein the adjustable elements are elongated and extend along the longitudinal direction, wherein the adjustable elements comprise stacked layers, wherein a thickness of the adjustable elements in a radial direction is altered along the longitudinal direction, and wherein the thickness of the adjustable elements in a radial direction is altered by at least one removed or added layer along the longitudinal direction, and a conductor wherein the conductor is wound around the form element along the longitudinal direction forming turns of the winding.

2. The winding according to claim 1, wherein the cross section of the form element perpendicular to the longitudinal axis is symmetrical to a central point of the cross section.

3. The winding according to claim 1, wherein the adjustable elements are arranged uniformly on the lateral surface of the core.

4. The winding according to claim 1, wherein 12, 16, 24 or 36 adjustable elements are arranged on the lateral surface of the core.

5. The winding according to claim 1, wherein the thickness of the adjustable elements in a radial direction alters gradually along the longitudinal direction.

6. The winding according to claim 1, wherein the thickness of the adjustable elements in a radial direction varies by an amount of 0.1 mm to 10 mm along the longitudinal direction.

7. The winding according to claim 1, wherein the layers comprise a first type of layer and a second type of layer, wherein the first type of layer has a greater thickness than the second type of layer, and wherein the thickness of the adjustable element is altered along the longitudinal direction by either a removed at least one second type of layer, or by an added least one second type of layer.

8. The winding according to claim 7, wherein at least one second type of layer is arranged on the core in a radial direction and one first type of layer is stacked on the at least one first type of layer, and wherein the thickness of the adjustable element is altered along the longitudinal direction by either a removed at least one second type of layer, or by an added least one second type of layer added in between the core and the at least one first type of layer.

9. The winding according to claim 8, wherein a further first type of layer is stacked on the one first type of layer in a radial direction, and wherein the thickness of the adjustable element is altered along the longitudinal direction by either a removed at least one second type of layer, or by an added at least one second type of layer added in between the core and the further first type of layer.

10. The winding according to claim 7, wherein one first type of layer is arranged on the core in a radial direction and at least one second type of layer is stacked on the at least one first type of layer, and a second first type of layer is stacked on the at least one second type of layer, and wherein the thickness of the adjustable element is altered along the longitudinal direction by either a removed at least one second type of layer, or by an added at least one second type of layer added in between the core and the second first type of layer.

11. The winding according to claim 7, wherein the first type of layers have a thickness of 3 mm to 10 mm.

12. The winding according to claim 1, wherein the layers are adhered to each other or the core at discrete spots along the longitudinal direction.

13. The winding according to claim 1, wherein the layers comprise materials based on cellulose fiber as paper, pressboard, cardboard, wooden strips, wooden sticks, batten or materials based on a polymer as DDP, epoxy or silicone.

14. The winding according to claim 1, wherein spacer elements are arranged in between the turns of the winding.

15. The winding according to claim 14, wherein the spacer elements are located above the adjustable elements in a radial direction.

* * * * *